United States Patent [19]
Sullivan et al.

[11] 3,767,156
[45] Oct. 23, 1973

[54] LOCK MOLD ASSEMBLY FOR A CONTAINER MOLD

[75] Inventors: Robert D. Sullivan; Gottfried W. Jutte, both of Indianapolis, Ind.

[73] Assignee: The Richardson Company, Des Plaines, Ill.

[22] Filed: May 17, 1971

[21] Appl. No.: 143,969

[52] U.S. Cl. .................................. 249/107, 425/249
[51] Int. Cl. ................................................. B29c 1/60
[58] Field of Search.................... 425/249, 468, 242; 249/63, 64, 66, 67, 68, 105, 107, 110

[56] References Cited
UNITED STATES PATENTS

| | | | |
|---|---|---|---|
| 3,473,197 | 10/1969 | Wilds et al. | 425/249 |
| 3,509,603 | 5/1970 | Halsall et al. | 425/249 |
| 3,564,660 | 2/1971 | Darnell | 425/249 X |
| 3,585,690 | 6/1971 | Tucker | 425/249 X |
| 3,481,002 | 12/1969 | Dreps | 425/468 X |
| 3,301,928 | 1/1967 | Plymale | 425/468 X |
| 3,305,892 | 2/1967 | Heider | 425/468 X |
| 3,520,026 | 7/1970 | Stidham et al. | 425/242 |

Primary Examiner—J. Howard Flint, Jr.
Attorney—John L. Hutchinson, Alan M. Abrams and Howard M. Ellis

[57] ABSTRACT

A mold assembly for preparing containers comprising a cavity member and a core member having depending core segments where the free ends of such core members are stabilized during molding by means of locking members within such core members and engagable with the cavity member so as to produce partitions and walls for the containers of uniform thickness and spacing.

3 Claims, 10 Drawing Figures

Patented Oct. 23, 1973

INVENTORS
ROBERT D. SULLIVAN
GOTTFRIED W. JUTTE

BY Alan M. Abrams
Attorney

Patented Oct. 23, 1973  3,767,156

INVENTORS
ROBERT D. SULLIVAN
GOTTFRIED W. JUTTE
BY Alan M Abrams
Attorney

LOCK MOLD ASSEMBLY FOR A CONTAINER MOLD

In the preparation of multi-partitioned, thin-walled containers, as exemplified by plastic battery boxes having a plurality of internal cell compartments formed by the partitions, various molding procedures are currently being employed. Typically, such containers are molded in a mold assembly comprising a cavity member enclosing a core member having a plurality of depending segments which shape the moldable material during molding to form the side and bottom walls as well as the partitions. Preferably this molding procedure utilizes modern injection molding techniques which basically comprises high pressure injection of a moldable material, for example, polypropylene, into the mold assembly to fill the space between the cavity member and the core member. When utilizing this preferred molding technique, however, certain rather serious problems arise which limit its full utilization. For example, the extremely high pressures and fluid flow of the injected, moldable material can and often does cause deflection of the free ends of the depending core segments. This produces variations in the thickness of the side walls and partitions and an uneven relationship for the compartments. In the instance of battery boxes, these distortions in the container render insertion of the cell plates and subsequent construction of the battery more difficult.

Various procedures and mold assemblies have been suggested and employed to avoid this problem which all essentially operate to stabilize the free ends of the core segments during the molding operation. Typically, this stabilization is achieved by employing movable members associated with the mold assembly to press or force against the free ends of the core segments to prevent deflection of the core segments during formation of the walls and partitions. Subsequent to formation of the walls and partitions, the movable members are then retracted from pressure contact against the core segments permitting the injected, moldable material to then flow into the space originally occupied by the movable member and thereby complete formation and closure of the container walls.

While this procedure has been successful in lessening the problem of unequal wall thicknesses and spacing for the partitions, it still has not completely eliminated the problem. In fact, it has created new problems such as requiring complex molding assemblies and substantially reducing the interior usable volume of the container. For example, because the movable member employed usually involves a force or pressure against the free ends of the core segments, any excessive pressure or movement exerted by the locking member will itself cause the undesired deflection of the free ends of the core segment. This necessitates relatively complex mold assemblies and mechanisms to insure that the locking member is properly dimensioned and operating. Further, because the locking arrangement utilizes only a pressure fit, there is often some slippage between the locking member and the core segment, particularly after excessive mold wear, to cause further undesired deflection of the core segments. Of even greater significance, however, is the fact that the movable members typically employed in this procedure leave a plurality of indentations or cavities in the finished container walls which aside from weakening the container, project inwardly into the container interior and lessen the available interior volume. This is particularly undesirable in the instance of battery boxes because one of the basic objectives of utilizing thin-walled containers for battery boxes is to maximize the available interior space for insertion of larger cell plates with greater electrolyte volume in a battery box of the same overall dimensions. Quite obviously, the presence of numerous indentations or projections which extend into the container and lessen the available interior space destroys this basic objective of increasing the available interior space to accommodate larger cell plates and greater electrolyte volume.

Accordingly, an object of this invention is to provide a mold assembly for preparing thin-walled, multi-partitioned containers, particularly plastic battery boxes, which avoids the problem heretofore encountered when utilizing injection molding techniques. Another object is to provide such an assembly which mechanically locks the free ends of the core segments during injection molding to positively prevent any deflection of the core segments and thereby achieve highly uniform spacing and thickness for the molded side walls and partitions. A further object is to provide a mold assembly which is simple in construction and operation and yet capable of producing a container with uniformly spaced partitions without loss of any substantial interior volume resulting from excessive cavities or indentations in the container walls. These and other objects of this invention will be apparent from the further following detailed description thereof as well as from the attached drawings.

Figure 1:
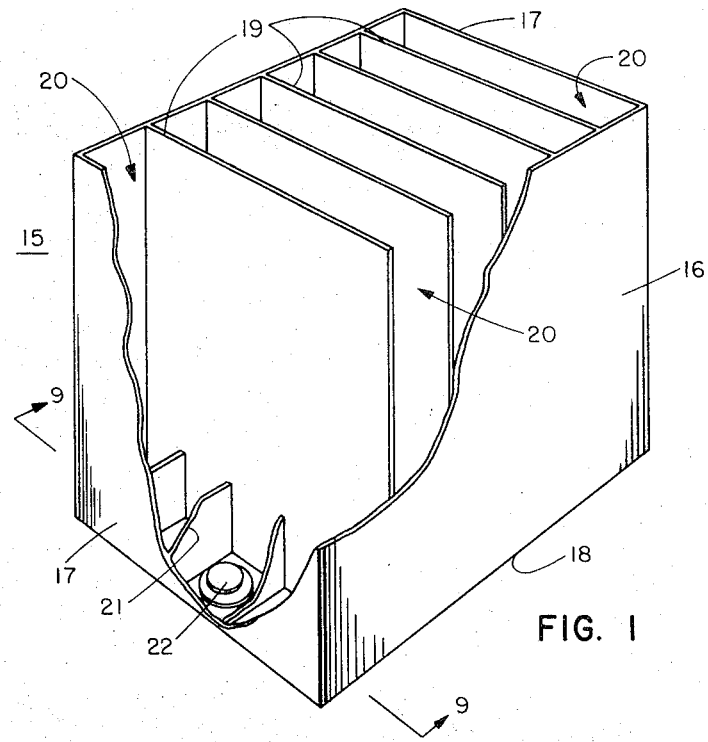
FIG. 1 is a perspective side view, with sections broken away, of a multi-partitioned, thin-walled container, according to the apparatus of this invention.
Figure 2:
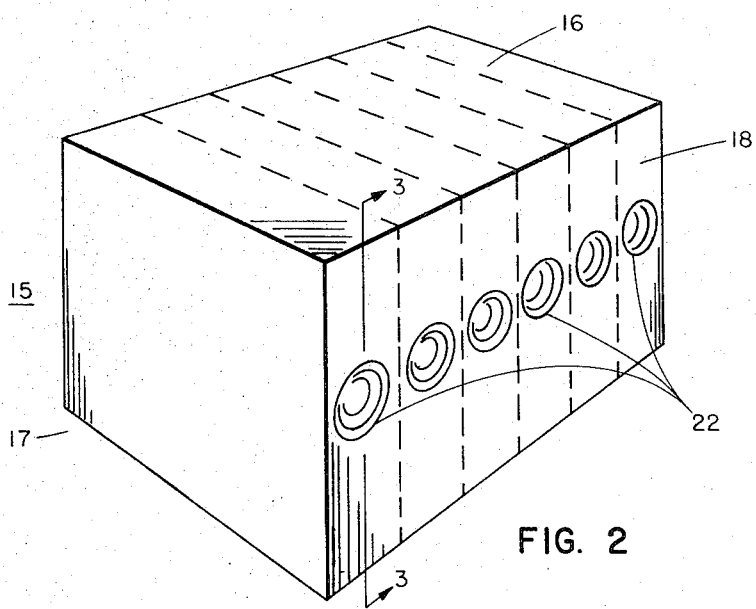
FIG. 2 is a perspective view taken from the bottom wall of the container of FIG. 1.
Figure 3:
FIG. 3 is an enlarged partial section view taken on a line 3—3 of FIG. 2 illustrating the cross sectional contour of a gate sealing section formed during the molding of the container of FIG. 1.

In reference to FIGS. 1 to 3, the multi-partitioned, thin-walled containers of this invention are illustrated by container 15 defined by vertical side walls 16 and end walls 17 respectively, and a horizontal bottom wall 18. Interior the container 15 are partitions 19 extending transversely between side walls 16 and upwardly from bottom wall 18 thereby forming individual compartments 20 which serve as cell compartments when container 15 is employed as a battery box. Reinforcing ribs 21 which extend upwardly from bottom wall 18 and longitudinally between end walls 17 serve to strengthen the container 15 and to act as supporting elements for the cell plates (not shown). Located in bottom wall 18 are gate sealing sections 22 best illustrated in the enlarged, transverse cross-section of FIG. 3 and more fully explained hereinafter.

The container 15 as shown is, of course, merely illustrative of the type of containers which can be prepared according to this invention. For example, the reinforcing and supporting ribs 21 may be varied in number and height and the number of partitions 19 can be widely varied and are illustrated here for a conventional battery box having six individual cell compartments 20 defined by 5 partitions 19 and the two end walls 17. Container 15 can be fabricated from any material capable of being injection molded to form relatively rigid thin walls of generally less than 0.2 inches thickness. Typically, and particularly for containers employed as battery boxes, the molded material is preferably a polyolefin, such as polypropylene.

Figure 4:
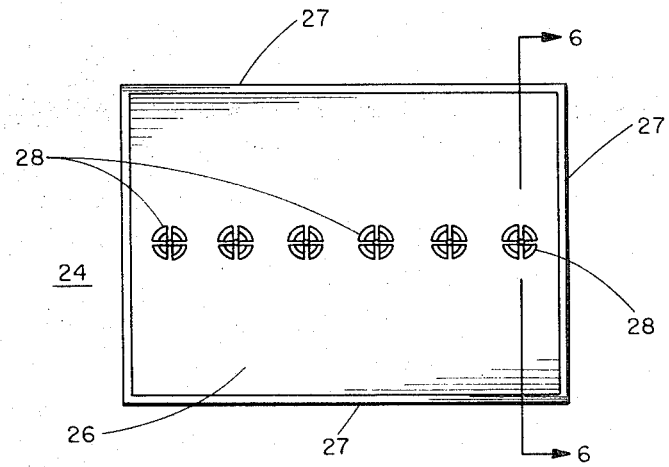
FIG. 4 is a top view of a cavity member embodied in the mold assembly of this invention.
Figure 5:
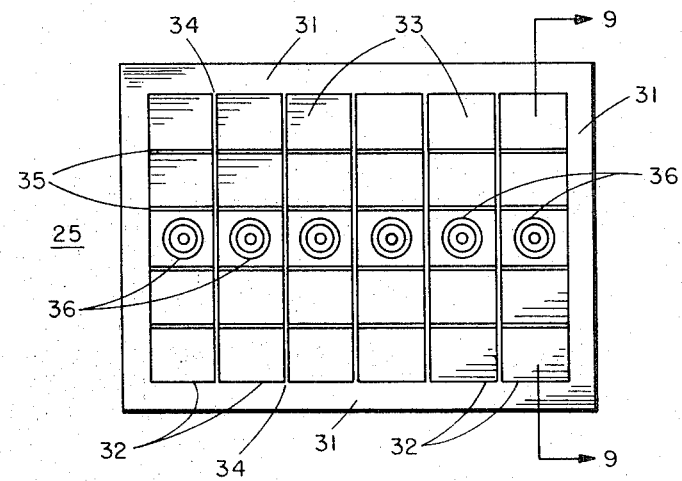
FIG. 5 is a bottom view of a core member embodied in the mold assembly of this invention and adapted for reception into the cavity member of FIG. 4 showing the depending core segments for forming the walls and partitions of the container of FIG. 1.
Figure 6:
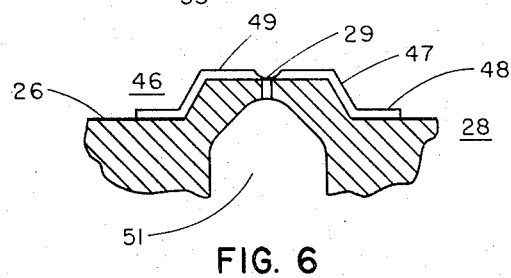
FIG. 6 is an enlarged partial section view taken along line 6—6 of FIG. 4 showing a port means of the cavity member illustrated in FIG. 4.

Container 15 is prepared in the mold assembly of this invention which is illustrated in a basic embodiment in FIGS. 4 and 5, as essentially comprising a cavity member 24 and a core member 25. The cavity member 24 and core member 25 which cooperate in molding operation under elevated heat and pressure to form the container 15, can be of any conventional construction as typically employed in an injection molding press (not shown). Accordingly, the unnecessary details of such conventional mold assemblies unrelated to the present invention or its understanding, for example stripper rings or ejection plates, have been omitted in FIGS. 4 and 5 for purposes of simplicity. Basically, the cavity member 24 comprises a bottom plate 26 and restraining walls 27 which can be stationary or movable to a fixed position during the injection molding cycle to provide positive restraining resistance to the injection pressure of the moldable material. Positioned in the bottom plate 26 are a plurality of port means 28 (best illustrated in FIGS. 6 and 7) each of which includes a centrally located opening or gate 29 for injection delivery of the moldable material, in liquid state, under high pressure into the interior of the cavity member 24. The core member 25 of FIG. 5 is adapted for insertion into the cavity member 24 and is designed and dimensioned to shape the container from the moldable material delivered to the cavity member 24 via the port means 28. core member 25 in simplest arrangement comprises a backplate 31 to which a plurality of depending core segments 32 are fixedly connected at their upper portions and capable of deflection at their bottom or free ends 33. As illustrated in FIG. 5, the core segments 32 are disposed from one another in conventional fashion to provide a series of transverse spaces 34 within which the partitions 19 of the container 15 are formed (FIG. 1). The end walls 17 and side walls 16 are formed within the mold assembly in the clearance between the core segments 32 (FIG. 5) and restraining walls 27 (FIG. 4) of the cavity member 24. The bottom wall 18 is similarly formed in conventional fashion within the clearance provided between the free ends 33 (FIG. 5) of the core segments 32 and the bottom plate 26 of the cavity member 24. The core segments are also provided with longitudinally extending apertures 35 which are adapted to shape the reinforcing ribs 21 of container 15.

Figure 9:
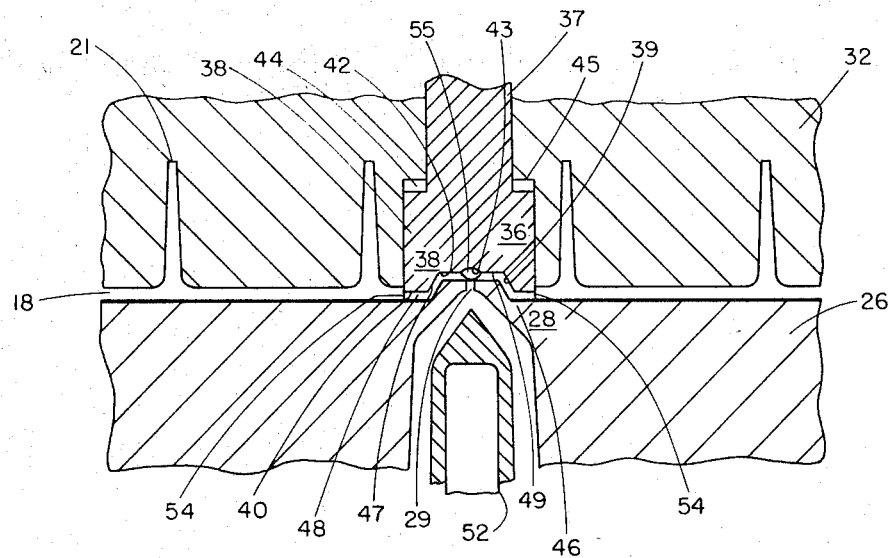
FIG. 9 is a section view taken along line 9—9 of FIG. 1 and illustrating the container of FIG. 1 during molding formation in the cavity member of FIG. 4 with the core member of FIG. 5 inserted into the cavity member and illustrates the initial phase of the injection molding cycle when the core segments are in locked position during formation of the partitions and walls of the container.

In a particularly preferred embodiment and as shown in FIG. 5, each core segment 32 is equipped with a locking means 36, more clearly shown in FIG. 9, which is located interior the core segment 32 and centrally disposed therein. Each locking means 36 is positioned in the core segment 32 so that when the core member 25 is inserted within the cavity member 24, each locking means 36 is adjacent and in registry with a corresponding port means 28 located in the bottom plate 26 of the cavity member 24. The operation of the locking means 36 and the port means 28 is most readily understood by reference to FIGS. 9 and 10 which show in enlargement the lock-mating arrangement of the locking means 36 and port means 28.

Figure 8:
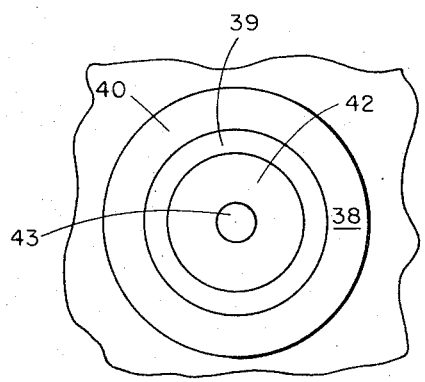
FIG. 8 is an enlarged bottom view of a locking member isolated from the core member of FIG. 5.

As shown in FIG. 9, the locking means 36 suitably includes an elongated pin-shaft or rod 37 which suitably has an open-ended terminal section 38. In preferred arrangement as shown in FIGS. 8 and 9, this terminal section 38 of the rod 37 is generally shaped conically inwardly and is defined by an annular ring skirt section 39 extending inwardly from the bottom ring shoulder 40 and terminating in a horizontally disposed circular center section 42. Preferably located in the center of the circular center section 42 is a concavity 43 which, as hereinafter more fully explained, serves to assist the equal fluid distribution for the injected moldable material delivered via the gate 29 of the port means 28. The terminal section 38 of the rod 37 is suitably housed within a tapped chamber 44 of the core segment 32 and the rod 37 is movable within the core segment 32 so that the terminal section 38 can be engaged with or retracted from the port means 28. The rod 37 can be driven by any suitable moving means (not shown) conventionally employed with mold assemblies, for example, cams in combination with pneumatic or hydraulic cylinders, to either extend or retract the rod 37 and hence the terminal section 38 from an engaged relationship with the port means 28 at an appropriate phase of the injection molding cycle. The back shoulder 45 of the tapped chamber 44 is so arranged that when the rod 37 is retracted, as hereinafter explained, the shoulder 45 will provide a positive stop for the terminal section 38. Thus, the desired retracted distance between the terminal section 38 and the port means 28 will always be maintained to assure proper formation of the gate seal section 22 which closes the bottom wall 18.

FIG. 9 represents that phase of the injection molding cycle when the terminal section 38 of the rod 37 is extended by the moving means (not shown) to engage in a mating relationship with the port means 28 during the molding formation of the side walls 16, end walls 17, bottom wall 18 and the partitions 19 of the container 15. The port means 28 as shown in FIGS. 6, 7, 9 and 10 suitably include a conical projection 46 raised from the bottom plate 26 of the cavity member 24 and composed of an annular skirt section 47 extending inwardly and upwardly from an annular bottom ring 48 and terminating at a horizontal top section 49. Centrally located in the top section 49 is the gate 29 which communicates inwardly with a nozzle chamber 51 (FIG. 6) located below the conical projection 46 within the cavity member 24. Nozzle chamber 51 has an appropriate heater 52 for maintaining the moldable material in liquid state during injection from the nozzle chamber through the gate 29.

The raised conical projection 46 of the port means 28 and the terminal section 38 of the rod 37 are mutually adapted and dimensioned so that when the rod 37 is extended by the moving means (not shown), the raised projection 46 is substantially received into and mates with the terminal section 38 of the rod 37. In such engaging relationship, the port means 28 and the terminal section 38 of the rod 37 are fixedly and mechanically locked together so as to positively preclude any possible movement or deflection of the particular core segment 32 associated with the rod 37. As can be observed by reference to FIG. 9, this locking arrangement provides positive resistance to any movement of the core segment 32 either normal or perpendicular to the center axis of the rod 37, thus maximizing the stability of the core segment 32 in a plurality of different planes.

Figure 7:
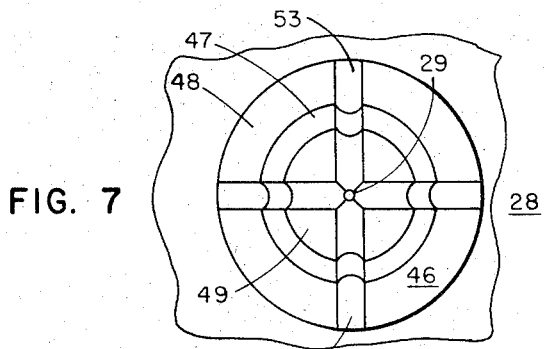
FIG. 7 is a top view of the port means of FIG. 6 showing runner grooves in the surface thereof.

When the locking means 36 and the port means 28 are in a locked mating arrangement, as represented in FIG. 9, a fluid tight seal is formed between the mating parts to preclude any passage of the moldable material via the gate 29 into the cavity member 24. More specifically, as shown in FIG. 9, bottom ring shoulder section 40, annular skirt section 39 and annular center section 42 of the terminal section 38, contact and mate with the corresponding bottom ring section 48, skirt section 47 and top section 49 of the conical projection 46. Accordingly, in a particularly preferred embodiment and as shown in FIG. 7, the conical projection 46 of the port means 28 has a series of indentations or grooves 53 in its surface. When the terminal section 38 of the rod 37 engages the conical projection 46 in a locked and fluid tight arrangement, a series of passageways 54 (FIG. 9) are thereby formed which are defined by the grooves 53 and the corresponding mating surfaces of the terminal section 38. These passageways 54 serve as runners for delivery of the moldable material from the gate 29 into the space within the mold assembly between the core member 25 and the cavity member 24. Thus, when the locking means 36 and port means 28 are in locked arrangement, the moldable material has access to the interior of cavity member 24 from the gate 29 without disturbing the locking arrangement. In fluid flow, the moldable material first discharges into a distribution chamber 55 formed by the concavity 43 (FIG. 8) and adjacent top section 49 of the conical projection 46 (FIG. 6) and then passes therefrom through the runner passageways 54 and between the cavity member 24 and core member 25, to form the side walls 16, end wall 17, bottom wall 18, and partitions 19 of container 15. This unique arrangement provided by the mating and locking members of the core member 25 and cavity member 24 to simultaneously serve as a locking device for stabilization of the free ends 33 of the core segments 32 and also to create runner passageways 54 for the mold assembly, further serves to greatly maximize the uniformity of the thickness and spacing for the partitions 19. This is achieved because the stabilization of the core segments 32 is maintained at the point where the greatest fluid turbulence usually occurs when the molded material is injected into the cavity member 24 via the gate 29.

While there need be only one groove 53 in the surface of the conical projection 46 of the port means 28 to form a single passageway 54 for delivery of the moldable material, the grooves 53 are shown in FIG. 7 in a preferred arrangement comprising a plurality of grooves 53. Advantageously, there are four grooves 53 each extending outwardly from the gate 29 and equally spaced at 90° intervals about the gate 29. This preferred arrangement provides greater fluid distribution of the moldable material when injected into the mold assembly via the plurality of passageways 54. For the same reason, the gate 29 and grooves 53 may vary in size to provide a balanced flow of the moldable material.

Other less preferred methods may be employed for delivery of the moldable material in addition to forming passageways 54 by means of grooves 53. For example, interior passageways (not shown) may be incorporated into the terminal section 38 of the rod 37 for delivery of the moldable fluid from the gate 29. Alternatively, the grooves 53 may be originally placed into the interior or inside diameter surface of the terminal section 38 rather than in the surface of the raised conical projection 46. It is, of course, also obvious from the foregoing that the locking means 36 and port means 28 may be reversed if desired from a male-female locking relationship respectively to a female-male relationship. For example, while not shown in the drawings, the terminal section 38 can be conically shaped outwardly and the conical projection 46 can be shaped concavely inwardly. A still further obvious variation of the mold assembly of this invention not illustrated in the drawings involves the employment of more than one locking means 36 and port means 28 for each respective core segment 32 or alternatively having only alternate core segments 32 equipped with locking means 36 in association with alternate port means 28. However, the greatest stability of the core segments 32 and obtainment of maximum interior spatial volume as hereinafter discussed is generally achieved when utilizing only one locking means 36 for each core segment 32.

Figure 10:
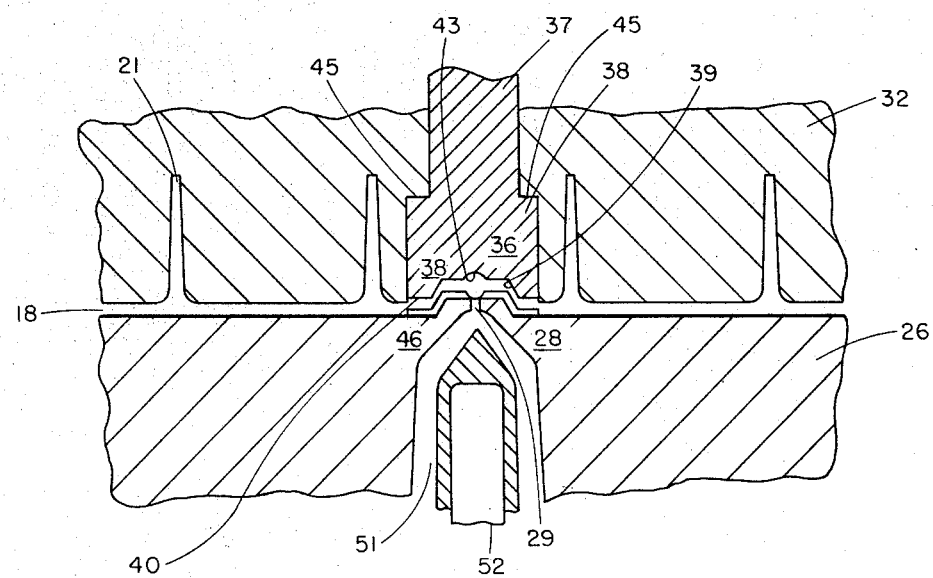
FIG. 10 is a view similar to FIG. 9 but illustrates the subsequent phase of injection molding cycle when the core segments are unlocked after formation of the walls and partitions during formation of the gate sealing section of FIG. 3.

After the space between the cavity member 24 and the core member 25 representing the side walls 16, end wall 17, bottom wall 18 and partitions 19 of the container 15 have been filled with moldable material, the terminal section 38 of the rod 37 is retracted from its locking arrangement with the port means 28. This retraction is effected by the moving means (not shown) and programmed by any conventional timing device operational on any suitable parameter which assures that the proper amount of moldable material has been injected. This non-engaging arrangement of the port means 28 and locking means 36 is best illustrated in FIG. 10 where the terminal section 38 of the rod 37 has been fully retracted within the tapped chamber 44 of the core segment 32. With the rod 37 in such retracted position, the moldable material leaving the gate 29 in the port means 28 will now flow into the space originally occupied by the terminal section 38 so as to complete closure of the container bottom wall 18 by forming a gate closure section 22 in the container 15. Because the space between the cavity member 24 and the core member 25 has previously been filled completely with the moldable material, there will be no deflection of the core segments 32 resulting from the injection pressure of the molded material flowing into the space immediate to the gate 29. After the gate closure section 22 of the container 15 is filled with the moldable material, the injection molding is terminated and after a sufficient molding residence time, the mold assembly is opened and the container 15 is removed from the cavity member 24 using conventional procedures.

The container 15 thus molded in the mold assembly of this invention possesses walls and partitions of highly uniform spacing and thickness which results from the positive locking arrangement of the locking means 36 and the port means 28 during the initial phase of the injection molding cycle. Moreover, because the locking means 36 and port means 28 for the injection of moldable material within the cavity member 24 mate together at the same point in molding the container 15, only one series of indentations occurs, such as gate sealing sections 22, projecting into the interior of the container 15. This may be observed in FIGS. 1 and 2 which show only one series of gate sealing sections 22 located in the bottom wall 18 with each sealing section 22 positioned within one compartment 20. Thus container 15, in addition to possessing high uniformity for the spacing and thickness of the partitions 19, also is structurally characterized by a substantial absence of a plurality of indentations projecting into the interior of the container 15 which reduce the available interior spatial volume. This is, of course, in structural contrast to the multi-partitioned, thin-walled containers presently produced by injection molding techniques utilizing locking members which are structurally characterized by several series of indentations or projections extending into the container interior and formed as a consequence of utilizing a plurality of locking members separate from injection ports.

We claim:

1. A mold assembly adapted for injection molding multipartitioned, thin walled containers comprising in combination a core member having a plurality of depending core segments each fixedly mounted at one end, a cavity member for receiving the core member, port means in the cavity member adjacent the free ends of the core segments for injecting moldable material into the space between the cavity member and the core member, locking means within the core segments extendable to engage the port means and thereby lock the free ends of the core segments in fixed position during injection of the moldable material and retractable after the space between the core member and cavity member has been filled with the moldable material to allow such material to then fill the space initially occupied by the locking means when engaged with the port means said locking means include an elongated rod positioned and movable within each core segment and having a generally concave terminal section, said port means being integral with the cavity member and each in registry with a corresponding locking means and each having a generally raised conical shape so as to mate into and with the corresponding concave terminal section of the elongated rod and to form therebetween at least one runner for passage of the moldable material from the port means into the space between the cavity member and the core member.

2. The mold assembly of claim 1 wherein a plurality of runners are formed by each mating port means and respective locking means and such runners are defined by grooves in the surface of the port means and by the corresponding mating surface of the locking member in registry with the grooves and such grooves extend radially outwardly from a centrally located gate in the port means.

3. The mold assembly of claim 1 wherein four runners are formed by the mating conically shaped port means and the concave terminal section of the locking member which are defined by grooves in the surface of the port means and the corresponding mating surfaces of the locking means in registry with the grooves and the grooves extend radially outwardly from the centrally located gate in the port means and are spaced 90° from each other.

* * * * *